United States Patent
Perna et al.

(10) Patent No.: US 7,510,793 B2
(45) Date of Patent: Mar. 31, 2009

(54) POST-REFORMER TREATMENT OF REFORMATE GAS

(75) Inventors: Mark A. Perna, Alliance, OH (US); Milind V. Kantak, Mayfield Heights, OH (US); Daniel P. Birmingham, Canton, OH (US); Gregory C. Rush, Canton, OH (US); Crispin L. DeBellis, North Canton, OH (US)

(73) Assignee: Rolls-Royce Fuel Cell Systems (US) Inc., North Canton, OH (US)

(*) Notice: Subject to any disclaimer, the term of this patent is extended or adjusted under 35 U.S.C. 154(b) by 848 days.

(21) Appl. No.: 10/913,057

(22) Filed: Aug. 5, 2004

(65) Prior Publication Data
US 2006/0029540 A1   Feb. 9, 2006

(51) Int. Cl.
*C01B 3/22* (2006.01)
*C01B 3/24* (2006.01)
*H01M 8/04* (2006.01)

(52) U.S. Cl. .............. 429/17; 423/648.1; 423/650; 423/651

(58) Field of Classification Search .......... 423/650, 423/648.1, 651; 429/17
See application file for complete search history.

(56) References Cited

U.S. PATENT DOCUMENTS 5,628,931 A  5/1997 Lednor et al.
6,726,850 B1 * 4/2004 Reyes et al. .............. 252/373

FOREIGN PATENT DOCUMENTS

| CA | 2250893 | 10/1997 |
| EP | 0842894 | 5/1998 |
| GB | 2274284 | 7/1994 |
| WO | WO 01/51412 | 7/2001 |

OTHER PUBLICATIONS

CO2 Reforming and Partial Oxidation of Methane, Topics in Catalysis, Baltzer Science Publishers, 1996, vol. 3, No. 3/4, pp. 299-311.

* cited by examiner

*Primary Examiner*—Wayne Langel
(74) *Attorney, Agent, or Firm*—Krieg DeVault LLP

(57) ABSTRACT

A method of modifying reformate gas composition downstream of the reformer so that it remains in a carbon-free region, i.e. above the critical oxygen/carbon ratio even at the desired minimum operating temperature. This is accomplished by using staged partial oxidation in a partial oxidation chamber downstream of the reformer. A small amount of air (or oxygen) is added. The net result is an increase in the oxygen/carbon ratio and, thus, a lowering of the required temperature for soot-free operation. Immediately downstream of this partial oxidation chamber, heat can be removed to cool the gas prior to a second stage of partial oxidation. A second stage partial oxidation chamber produces additional water and further increases the oxygen/carbon ratio and further lowers the required gas temperature for soot-free operation. Further stages of partial oxidation followed by cooling of the gas can be repeated until the oxygen/carbon ratio is sufficiently high to allow soot-free operation at the lowest required operating temperature.

14 Claims, 2 Drawing Sheets

POST-REFORMER TREATMENT OF REFORMATE GAS

BACKGROUND OF THE INVENTION

1. Field of the Invention

The invention is generally related to fuel reformers and more particularly to the treatment of the gas produced by a catalytic partial oxidation fuel reformer.

2. General Background

In most fuel cell systems including solid-oxide (SOFC) and proton-exchange membrane (PEM) fuel cell types, a hydrogen-rich gas is used to produce energy in the form of electricity and heat. When using a fuel other than pure hydrogen, a fuel reformer or fuel processor is required. A fuel reformer is a device that produces hydrogen from carbonaceous fuels such as natural gas, propane, gasoline, methanol, ethanol, or naphtha. A reformer combines fuel with a sub-stoichiometric amount of oxygen (air) to produce hydrogen and carbon monoxide for use in a fuel cell. The oxidation of the fuel releases heat, which may be captured and used elsewhere in the system. Water in the form of superheated steam is typically added with the feed streams to further react to yield the products and absorb heat.

It should be noted that any reformer can be operated in a catalytic partial oxidation (CPOX) mode by adjusting the feed conditions. The reformer feed conditions are typically characterized by two ratios; steam-to-carbon (steam/carbon) and air-to-fuel (oxygen/carbon, $O_2/C$) molar ratios. The CPOX reformer generally operates in steam/carbon and oxygen/carbon ranges of 0.0-2.5 and 0.5-0.7, respectively. These feed conditions may overlap with another form of reforming known as the Autothermal Reforming (ATR). The CPOX feed ratios are such that the overall reforming process is net exothermic. It is common practice for companies that operate reformers in a mode that is very similar to catalytic partial oxidation (CPOX) to put a different name on the reformer and process for the sake of having a unique name to distinguish themselves in the marketplace. For example, one company that operates its reformers at CPOX conditions calls it an Autothermal or ATR reformer. While proprietary or brand names may be different, the CPOX mode of reformer operation is characterized by partial oxidation that releases heat as described above.

There are some technical issues that must be addressed to improve the practicality and commercial nature of fuel cells. A need for an external water supply presents limitations, particularly for mobile applications where size and weight are critical. An external water supply also presents freezing problems in a cold climate. Depending on the reformer operating conditions, the product gas (typically hydrogen, carbon dioxide, carbon monoxide, nitrogen, methane) may have a tendency to form carbon if not maintained at elevated temperatures. Carbon (or soot) formation in flow lines, components, and fuel cell flow fields is detrimental to the system operation. Moreover, carbon deposition becomes critical during system start-up and shutdown conditions. Thermodynamically, the onset of carbon formation is a function of temperature, oxygen/carbon as well as steam/carbon ratios. The tendency to produce carbon gets severe at CPOX conditions, especially in waterless (steam/carbon=0) mode. The reformer operating condition determines the propensity towards carbon formation. Thus, developing a means of lowering the operating temperature while also preventing the formation of soot is a desirable goal in the area of all reformers and especially CPOX fuel reformers.

SUMMARY OF THE INVENTION

The invention addresses the above need. What is provided is a method of modifying the reformate gas composition downstream of the reformer so that it remains above the critical oxygen/carbon ratio even at the desired minimum operating temperature. This is accomplished by using staged partial oxidation in a partial oxidation chamber downstream of the reformer to modify the reformate composition. A small amount of air (oxygen) is added to the reformed gas and reacts with hydrogen gas, forming water vapor and raising the temperature of the reformed gas via this exothermic reaction. The net result is an increase in the oxygen/carbon ratio and, thus, a lowering of the required temperature for soot-free operation. Immediately downstream of this partial oxidation chamber, the added heat can be removed prior to a second stage of partial oxidation. A second stage partial oxidation chamber produces additional water and further increases the oxygen/carbon ratio and further lowers the required gas temperature for soot-free operation. Further stages of partial oxidation followed by cooling of the gas can be repeated until the oxygen/carbon ratio is sufficiently high to allow soot-free operation at the lowest required operating temperature.

BRIEF DESCRIPTION OF THE DRAWINGS

For a further understanding of the nature and objects of the present invention reference should be made to the following description, taken in conjunction with the accompanying drawings in which like parts are given like reference numerals, and wherein.

DETAILED DESCRIPTION OF THE PREFERRED EMBODIMENT

Figure 1:
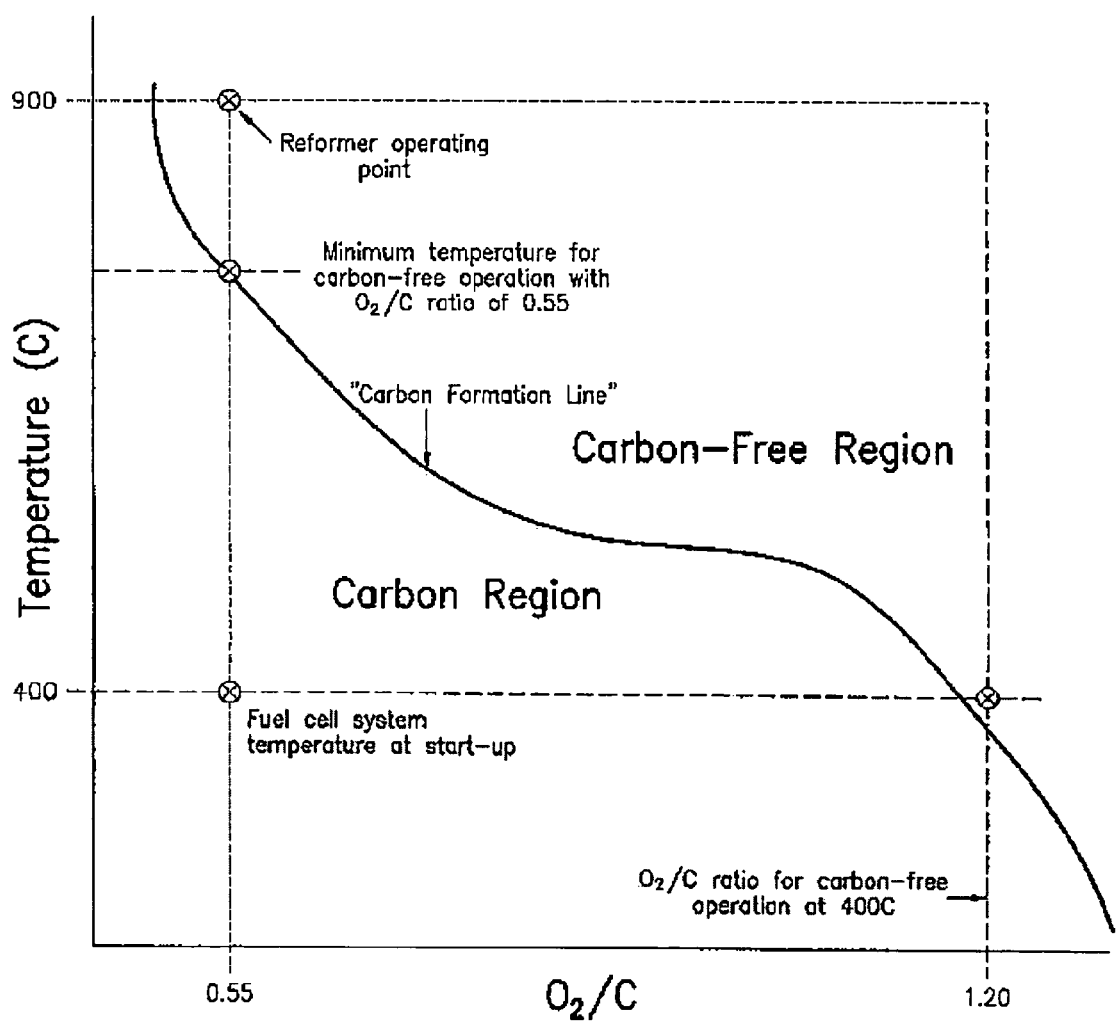
FIG. 1 is a graph that illustrates the relationship of soot formation to gas temperature and oxygen/carbon ratio at equilibrium.

Referring to the drawings, FIG. 1 illustrates the relationship of soot formation to gas temperature and oxygen/carbon ratio. It can be seen that increasing the oxygen/carbon ratio of the reformate gas is favorable for systems that must operate at lower temperatures. To remain in the soot-free (carbon-free) region at four hundred degrees Celsius, an oxygen/carbon ratio of about 1.2 moles oxygen per mole of carbon is estimated.

It is not possible to operate a waterless CPOX (catalytic partial oxidation) reformer to obtain such a high oxygen/carbon ratio in the reformate gas without exceeding the allowable temperature limit of the catalyst/substrate material. The CPOX reformer must operate with an oxygen/carbon ratio in the range of 0.5-0.7 to remain within its allowable temperature limit. However, it is possible to operate at higher temperatures downstream of the reformer using special pipe sections that can withstand higher temperatures.

Figure 3:
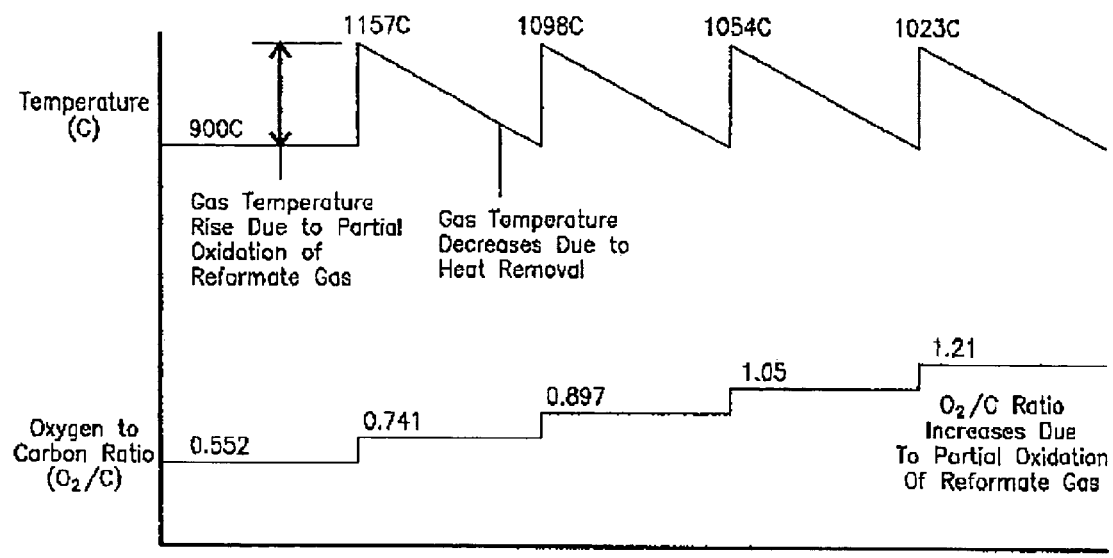
FIG. 3 is a schematic illustration in an example of the effect of the invention on the gas temperature and oxygen/carbon ratio.
Figure 2:
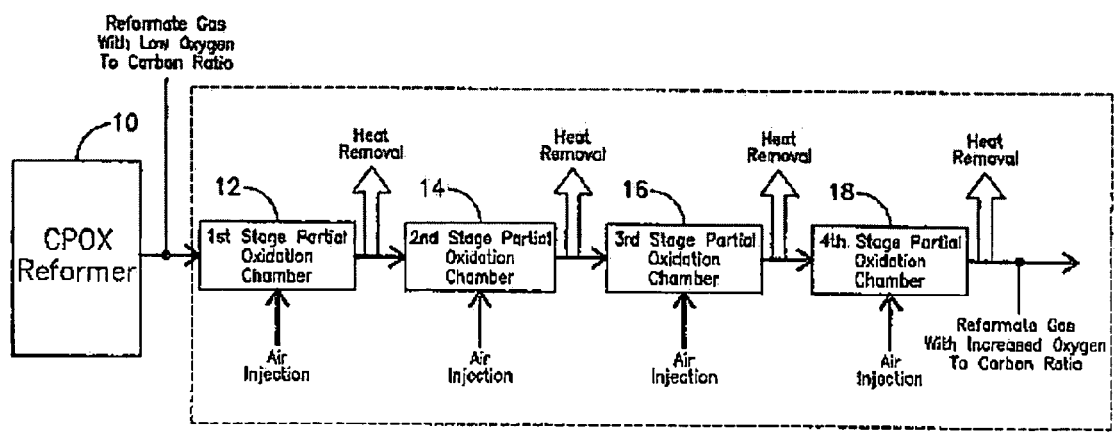
FIG. 2 is a schematic illustration of the method of the invention.

FIGS. 2 and 3 schematically illustrate the principle of the inventive method. The catalytic partial oxidation reformer 10 begins operation at 900 degrees Celsius. The reformate gas from the reformer is directed into a first stage partial oxidation chamber 12. The addition of a small amount of air (oxygen) into the first stage partial oxidation chamber to partially oxidize the reformate gas consumes a small amount of $H_2$ (hydrogen) and produces water. The exothermic reaction causes the gas temperature to increase, as illustrated in FIGS. 2 and 3. A portion of the produced water may be reacted by the available methane ($CH_4$) in the reformate gas and, since this reaction is endothermic, it will tend to limit the temperature rise of the gas. The net result is an increase in the oxygen/carbon ratio and, thus, a lowering of the permissible temperature for soot-free operation.

Immediately downstream of this first stage partial oxidation chamber 12, heat can be removed via inter-stage cooling prior to a second stage of partial oxidation. A second stage partial oxidation chamber 14 will produce additional water and further increase the oxygen/carbon ratio and further lower the permissible gas temperature for soot-free operation. Again, heat removal can be induced to cool the gas following the second stage of partial oxidation. As seen in FIGS. 2 and 3, additional stages of partial oxidation of the gas, followed by cooling of the gas, can be repeated until the oxygen/carbon ratio is sufficiently high to allow soot-free operation at the lowest required operating temperature. The number of stages can be adjusted to obtain a certain desired oxygen/carbon level.

An example of the method of the invention follows. A 10-kWe scale CPOX reformer 10 operating with natural gas and an oxygen/carbon ratio of 0.55 moles oxygen per mole of carbon produces 19.6 $lb_m$/hour of reformate gas containing 31% $H_2$, 14.6% CO, 3.3% $CO_2$, 1.3% $CH_4$, and the balance $N_2$. The exit temperature of the reformer is 900 degrees Celsius. At this oxygen/carbon feed ratio of 0.55, the reformer 10 is well above the minimum temperature required for soot-free operation. During the start-up of a solid oxide fuel cell it is desirable to use this reformate gas to purge the anode side of a solid oxide fuel cell prior to its reaching about 400 degrees Celsius. As seen in the graph of FIG. 1, the oxygen/carbon ratio must be approximately 1.20 for soot-free operation at such a temperature.

The reformate gas from the CPOX reformer 10 is directed into a first stage partial oxidation chamber 12. Approximately 25 SLPM of air is directed into the reformate gas in the first stage partial oxidation chamber 12 located immediately downstream of the reformer. This will cause the adiabatic gas temperature to increase to 1,157 degrees Celsius and will increase the oxygen/carbon ratio of the reformate gas to 0.741 as illustrated in FIG. 3. At this oxygen/carbon ratio, the temperature for soot-free operation is lowered to approximately 650 degrees Celsius. The treated gas from the first stage partial oxidation chamber 12 is cooled to 900 degrees Celsius and then directed into a second stage partial oxidation chamber 14. Approximately 25 SLPM of air is directed into the modified reformate gas in the second stage partial oxidation chamber 14. Again, the gas temperature rises to approximately 1,100 degrees Celsius and the oxygen/carbon ratio now increases to 0.897, Further lowering the permissible operating temperature for soot-free operation. As seen in FIGS. 2 and 3, third and fourth stages of partial oxidation indicated by numerals 16 and 18, followed by inter-stage cooling, can be used to increase the oxygen/carbon ratio to the required level of 1.20, which corresponds to the required operating temperature of 400 degrees Celsius in a solid oxide fuel cell. Additional stages of treatment may be used as necessary to obtain a desired oxygen/carbon ratio for carbon prevention.

Approximately 1 kW of heat must be removed following each stage of partial oxidation to cool the modified reformate gas back down to 900 degrees Celsius. This can be accomplished by using a simple coiled tube and allowing the heat to dissipate to the ambient surroundings.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method of treating reformate gas from a reformer to prevent soot formation, comprising the steps:
   a. establishing a relationship characterizing soot formation in a treated reformate gas as a function of a temperature and an oxygen/carbon ratio of the treated reformate gas, the relationship defining a minimum temperature as a function of the oxygen/carbon ratio at which no soot will form in the treated reformate gas;
   b. directing the reformate gas into a partial oxidation chamber;
   c. directing a predetermined amount of air into the partial oxidation chamber;
   d. cooling the treated reformate gas to, but not lower than, a temperature at or above the minimum temperature at the oxygen/carbon ratio of the treated reformate gas.

2. The method of claim 1, further comprising repeating steps b, c and d for the treated reformate gas.

3. The method of claim 1, further comprising purging the anode of a fuel cell with the treated reformate gas during startup of the fuel cell.

4. The method of claim 1, further comprising receiving the reformate gas from the reformer prior to performing said directing the reformate gas into said first stage partial oxidation chamber.

5. A method of treating reformate gas from a reformer to prevent soot formation, comprising the steps:
   a. defining for a treated reformate gas a minimum temperature as a function of an oxygen/carbon ratio at which no soot will form in the treated reformate gas;
   b. receiving the reformate gas from the reformer;
   c. directing the reformate gas into a first stage partial oxidation chamber;
   d. directing a predetermined amount of air into the first stage partial oxidation chamber;
   e. cooling the treated reformate gas from the first stage partial oxidation chamber to, but not lower than, a temperature at or above a minimum temperature at the oxygen/carbon ratio of the treated reformate gas as output from the first stage partial oxidation chamber;
   f. directing the cooled reformate gas from the first stage partial oxidation chamber into a second stage partial oxidation chamber;
   g. directing a predetermined amount of air into the second stage partial oxidation chamber; and
   h. cooling the treated reformate gas from the second stage partial oxidation chamber to, but not lower than, a temperature at or above the minimum temperature at the oxygen/carbon ratio of the treated reformate gas as output from the second stage partial oxidation chamber.

6. The method of claim 5, further comprising repeating steps f, g and h using a third stage partial oxidation chamber.

7. The method of claim 5, further comprising purging the anode of a fuel cell with the treated reformate gas during startup of the fuel cell.

8. A method of treating reformate gas from a catalytic partial oxidation reformer to raise the oxygen/carbon ratio in the reformate gas in order to prevent soot formation, comprising the steps:

a. defining for a treated reformate gas a minimum temperature at which no soot will form in the treated reformate gas;
b. receiving the reformate gas from the reformer;
c. directing the reformate gas into a first stage partial oxidation chamber;
d. directing a predetermined amount of air into the first stage partial oxidation chamber;
e. cooling the treated reformate gas from the first stage partial oxidation chamber to, but not lower than, a temperature at or above the minimum temperature;
f. directing the cooled reformate gas from the first stage partial oxidation chamber into a second stage partial oxidation chamber;
g. directing a predetermined amount of air into the second stage partial oxidation chamber;
h. cooling the treated gas from the second stage partial oxidation chamber to, but not lower than, the temperature at or above the minimum temperature; and
i. repeating steps f, g and h using at least a third stage partial oxidation chamber as necessary to achieve a desired oxygen/carbon ratio.

9. The method of claim 8, further comprising purging the anode of a fuel cell with the treated reformate gas during startup of the fuel cell.

10. A method of treating reformate gas from a reformer for use in purging an anode of a fuel cell, comprising:
a. using the reformer to reform a fuel into a reformate gas having a first oxygen/carbon ratio;
b. receiving the reformate gas from the reformer;
c. treating the reformate gas by partially oxidizing the reformate gas to lower a minimum temperature at which no soot will form in the treated reformate gas and to yield a second oxygen/carbon ratio in the treated reformate gas that is greater than the first oxygen/carbon ratio;
d. cooling the treated reformate gas to, but not lower than, a temperature that is at or above the minimum temperature at the second oxygen/carbon ratio at which no soot will form in the treated reformate gas; and
e. purging the anode using the treated reformate gas.

11. The method of claim 10, further comprising repeating steps c and d to successively lower the minimum temperature at which no soot will form in the treated reformate gas and to yield a final oxygen/carbon ratio that is greater than the second oxygen/carbon ratio, the repeating of steps c and d being performed until the minimum temperature at which no soot will form in the treated reformate gas is below a predetermined temperature at which purging of the anode using the treated reformate gas is to be performed.

12. The method of claim 11, wherein the predetermined temperature at which purging of the anode is to be performed is approximately 400 degrees Celsius.

13. The method of claim 11, wherein steps c and d are repeated until the final oxygen/carbon ratio is approximately 1.2.

14. The method of claim 11, further comprising employing a catalytic partial oxidation reformer as the reformer.

* * * * *